United States Patent [19]
Duzac

[11] Patent Number: 5,935,663
[45] Date of Patent: Aug. 10, 1999

[54] SILHOUETTE CUTOUTS FOR WINDOW OF VEHICLE

[76] Inventor: Donald Duzac, 2601 Metairie Ct., Metairie, La. 70002

[21] Appl. No.: 09/079,957

[22] Filed: May 15, 1998

[51] Int. Cl.$^6$ ........................................................ B44F 7/00
[52] U.S. Cl. .................................. 428/31; 156/61; 428/79
[58] Field of Search .................................. 428/16, 31, 15, 428/79; 156/60, 61

[56] References Cited

U.S. PATENT DOCUMENTS

| | | |
|---|---|---|
| 3,751,100 | 8/1973 | Keyes ...................................... 428/31 X |
| 4,070,781 | 1/1978 | Saver ...................................... 428/31 X |
| 4,746,162 | 5/1988 | Maness .................................. 428/31 X |
| 4,783,350 | 11/1988 | DeMatteo et al. ......................... 428/16 |

*Primary Examiner*—Henry F. Epstein
*Attorney, Agent, or Firm*—Robert N. Montgomery

[57] ABSTRACT

A film appliqué in the form of a silhouette of the rear view of a human head applied to the rear window of a vehicle, the film being a semi-transparent reflective film of the type normally used as a tinting for vehicle window glass. The tinting film provides a reflective surface when illuminated, thereby giving the impression of occupants in the vehicle.

5 Claims, 2 Drawing Sheets

SILHOUETTE CUTOUTS FOR WINDOW OF VEHICLE

BACKGROUND OF THE INVENTION

1. Field of the Invention

This invention relates generally to two dimensional silhouette cutouts and more particularly to the placement of such cutouts on vehicle windows for the purpose of implying the presence of occupants in the vehicle

2. General Background

It is well known that when vehicles are left unattended, especially in unlighted areas, they become targets for theft and robbery. Single occupants of vehicles driving in high crime areas have also been targeted. By contrast, when a vehicle appears to be occupied and/or appears to have more than one occupant, the vehicle and its occupants seem to be targeted less often. Therefore, it seems that there is safety in numbers. Some drivers have taken to using mannequins for this purpose. Unlike the present invention mannequins take up space in both the vehicle and the truck when stored. They are also expensive and cause visual obstructions to the driver. Therefore, there is a need for an inexpensive method of providing an illusion that that the vehicle is occupied.

SUMMARY OF THE INVENTION

The present invention solves the problems stated above in a straight forward manner by simply applying a silhouette of a human head in the form of a film appliqué to the rear window of a vehicle, the film being a semi-transparent reflective film of the type normally used as a tinting for vehicle window glass. The tinting film provides a reflective surface when illuminated, thereby giving the impression of occupants in the vehicle. The appliqués are suitable for both day and night. Since the dark silhouette film is semitransparent, the image is still visible in bright sun light. The film silhouettes are equally applicable to slanted vehicle windows as well as vertical windows. Elongated silhouettes are provided to compensate for the foreshortening of the image on slanted windows. It is obvious that any number of special configurations can be provided which provide the illusion of occupancy. i.e. hair, hats etc. It is also obvious that side window appliqués could be provided as well.

BRIEF DESCRIPTION OF THE DRAWINGS

For a further understanding of the nature and objects of the present invention, reference should be made to the following detailed description taken in conjunction with the accompanying drawings, in which, like parts are given like reference numerals, and wherein.

DETAILED DESCRIPTION OF THE PREFERRED EMBODIMENT

Figure 1:
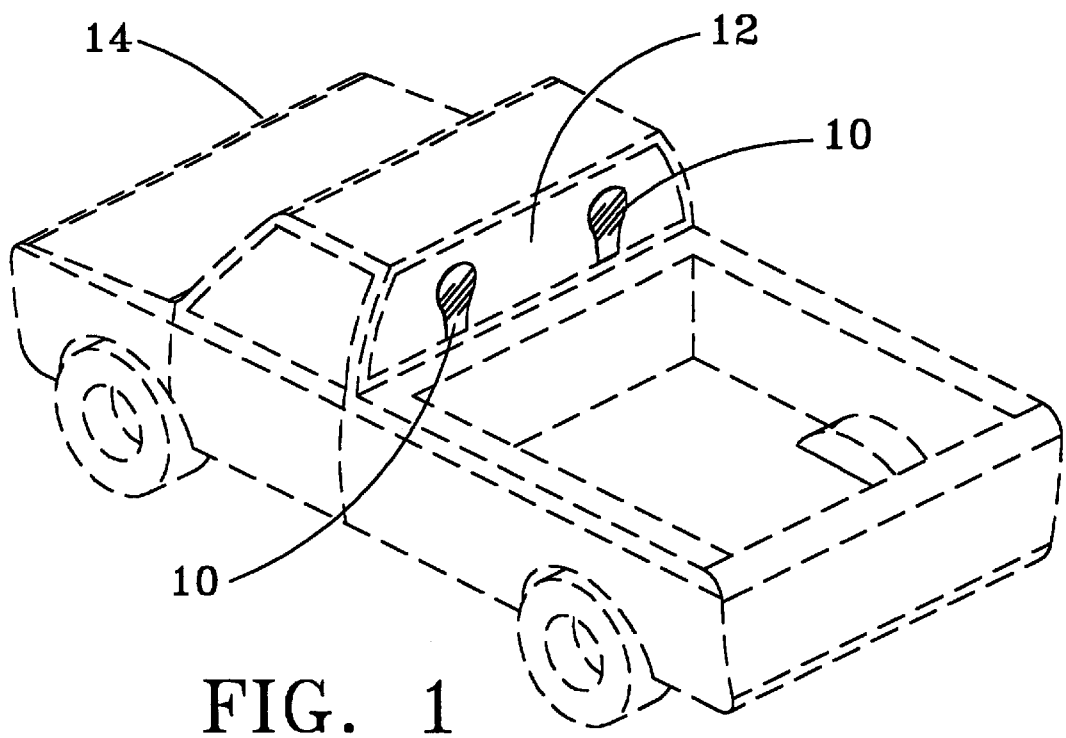
FIG. 1 is an isometric view of the silhouettes as they would appear located on a vertical window of a vehicle.
Figures 2, 3:
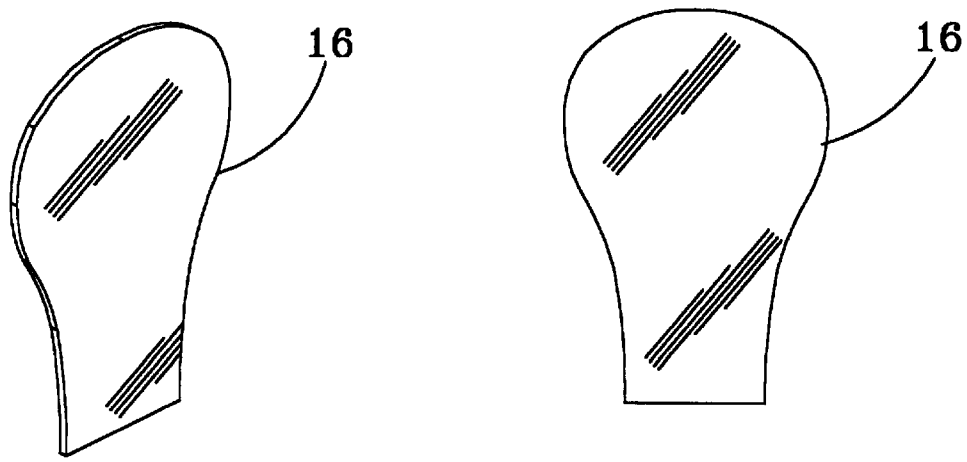
FIG. 2 is an isometric view of the silhouette film cut-out.
FIG. 3 is a vertical elevation of the silhouette film cut-out.

As seen in FIG. 1 a semitransparent film appliqué 10 can be applied to the inside window 12 of a vehicle, such as a truck 14 having a vertical rear window 12, thus giving the impression of occupancy. In which case the silhouette 10 resembling a human head would be cut out of a polymeric, reflective, film material 16 generally used for sun tinting on vehicle glass, usually having a thickness of between 1 and 2 mil. and applied in the usual manner as shown in FIGS. 2 and 3. The silhouette 10 need not be a true detail of a human head since it is simply an illusion subject to a glance by a casual observer. However, more detail may be applied if deemed necessary.

Figure 4:
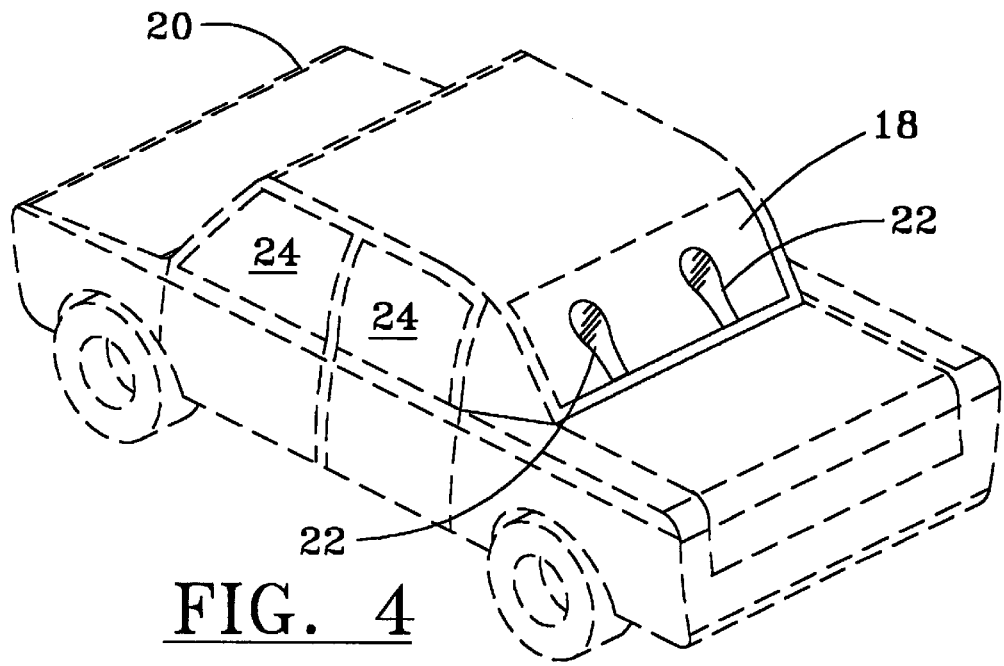
FIG. 4 is an isometric view of the silhouettes as they would appear located on a slanted window of a vehicle.
Figure 5:
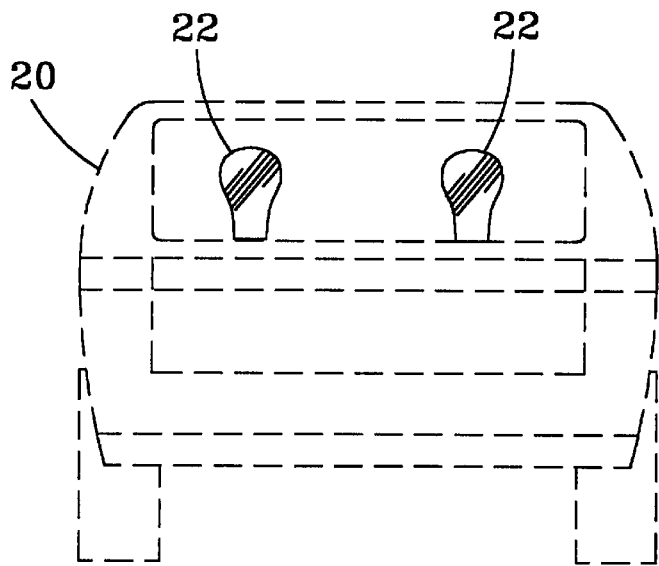
FIG. 5 is a rear view of the vehicle shown in FIG. 4 showing the silhouettes.
Figure 6:
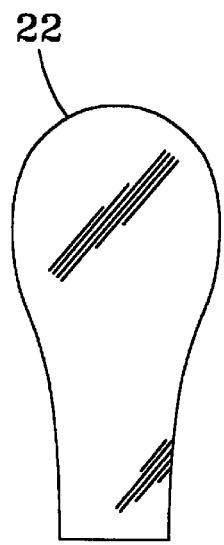
FIG. 6 is a vertical elevation of the silhouette film cut-out as applicable to slanted windows.

Vehicles having slanted rear windows such as passenger cars 20 as seen in FIG. 4, may also utilize the silhouettes 10 by simple elongation or distorting of the silhouette image thereby compensating for the foreshortening effect of the window. Therefore, the elongated silhouette 22 seen in FIG. 6 would appear normal as seen in FIG. 5. It is acknowledged that close inspection of the vehicle could reveal that, in fact, the vehicle is unoccupied. However, tinted side windows 24 may also further disguise the vehicle's occupancy. The film silhouettes may be applied to either tinted or untinted windows.

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in any limiting sense.

What is claimed is:

1. A method of simulating occupancy of a vehicle comprising the steps of:
   a) providing a silhouette cutout in the shape of a human head comprising a polymer film of 1 to 2 mil thickness; and
   b) applying at least one said silhouette directly to a window of said vehicle to provide the illusion of occupancy.

2. The method according to claim 1 wherein said method includes the step of elongating said silhouette to compensate for foreshortening due to application on slanted windows.

3. A method of simulating occupancy of a vehicle comprising the steps of:
   a) providing a semitransparent tinted film silhouette cutout in the shape of a human head comprised of a polymer film of 1 to 2 mill thickness; and
   b) applying at least one said tinted film silhouette directly to a rear window of said vehicle to provide the illusion of occupancy.

4. An appliqué for the rear window of a vehicle for simulating the occupancy of said vehicle by a human comprising a polymer film of 1 to 2 mil thickness cut in the shape of a rear view silhouette of a human head and which provides the illusion of occupancy.

5. An appliqué for the rear window of a vehicle according to claim 4 wherein said film is tinted.

* * * * *